US010325043B2

(12) United States Patent
Mutnury et al.

(10) Patent No.: US 10,325,043 B2
(45) Date of Patent: Jun. 18, 2019

(54) TIME DOMAIN RESPONSE SIMULATION SYSTEM

(71) Applicant: Dell Products L.P., Round Rock, TX (US)

(72) Inventors: Bhyrav Mutnury, Round Rock, TX (US); JayaGowri Anand Burji, Bangalore (IN); Nikita Ambasana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 562 days.

(21) Appl. No.: 14/668,399

(22) Filed: Mar. 25, 2015

(65) Prior Publication Data

US 2016/0283627 A1    Sep. 29, 2016

(51) Int. Cl.
*G06F 17/10* (2006.01)
*G06F 17/50* (2006.01)
*G06F 9/44* (2018.01)

(52) U.S. Cl.
CPC ...... *G06F 17/5031* (2013.01); *G06F 17/5009* (2013.01); *G06F 2217/84* (2013.01)

(58) Field of Classification Search
CPC .................. G06F 17/5009; G06F 17/5031
USPC ......................................................... 703/21
See application file for complete search history.

(56) References Cited

U.S. PATENT DOCUMENTS

| | | | | | |
|---|---|---|---|---|---|
| 5,043,930 | A | * | 8/1991 | Lin | F41G 3/32 703/6 |
| 6,128,578 | A | * | 10/2000 | Sakaino | G01S 13/951 702/3 |
| 6,850,871 | B1 | * | 2/2005 | Barford | G06F 17/5036 607/66 |
| 2004/0193382 | A1 | * | 9/2004 | Adamian | G01R 27/28 702/118 |
| 2007/0250559 | A1 | * | 10/2007 | Dhaene | G06F 17/5036 708/490 |
| 2011/0172796 | A1 | * | 7/2011 | Sohmshetty | G05B 19/41865 700/98 |
| 2015/0211934 | A1 | * | 7/2015 | Van Mechelen | G01J 5/10 250/339.06 |

* cited by examiner

*Primary Examiner* — Andre Pierre Louis
(74) *Attorney, Agent, or Firm* — Haynes and Boone, LLP

(57) ABSTRACT

The time domain response of a simulated system is simulated by first receiving variables for the simulated system. A frequency domain simulation is performed over different frequencies using each of the variables to provide simulated frequency domain responses for the simulated system. A time domain simulation is performed over the different frequencies using a subset of simulated frequency domain responses to produce a plurality of simulated time domain responses for the simulated system. The subset of the simulated frequency domain responses is mapped to the plurality of simulated time domain responses to produce a frequency-domain-to-time-domain mapping. A plurality of mapped time domain responses is determined using the frequency-domain-to-time-domain mapping, where the plurality of simulated time domain responses and the plurality of mapped time domain responses provide time domain responses for each of the plurality of variables for the simulated system.

20 Claims, 15 Drawing Sheets

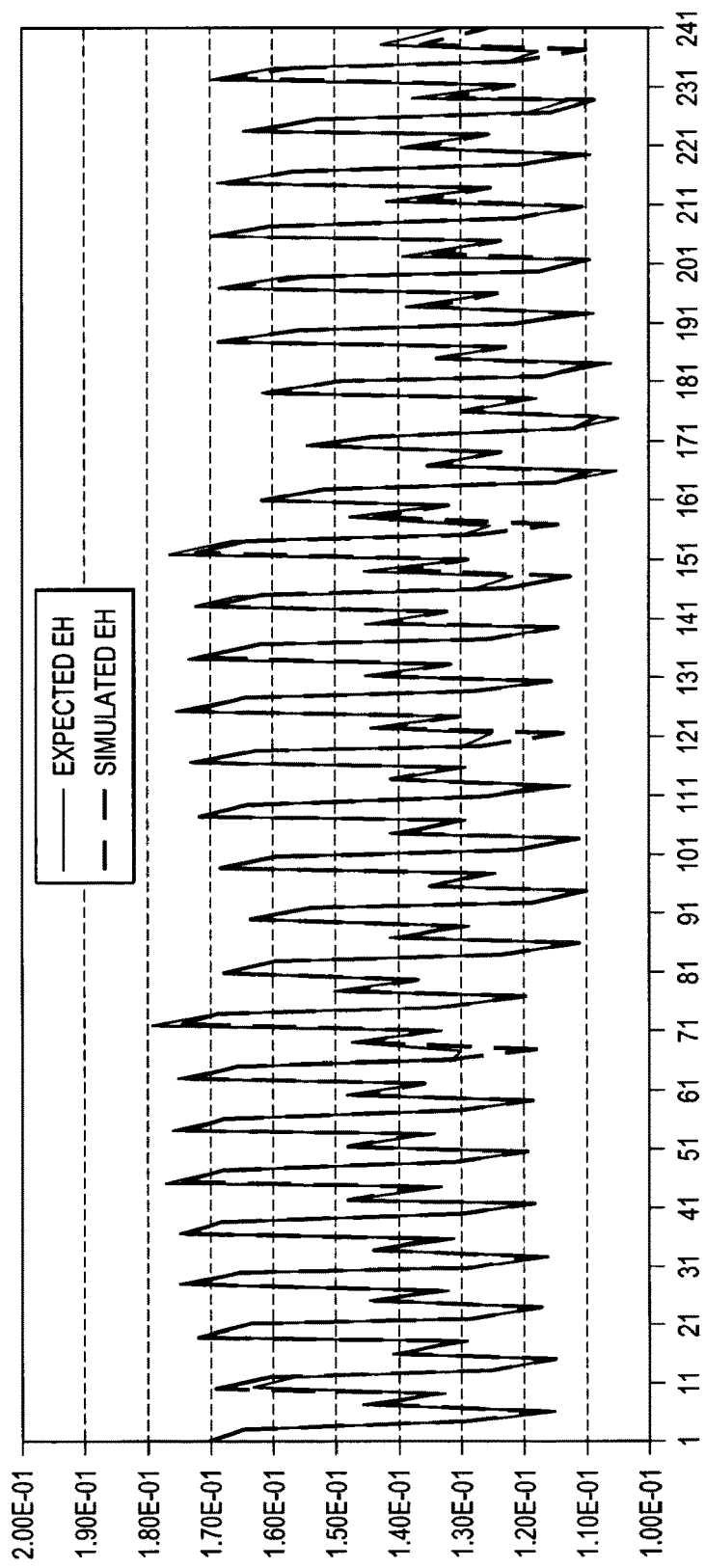

TIME DOMAIN RESPONSE SIMULATION SYSTEM

BACKGROUND

The present disclosure relates generally to information handling systems, and more particularly to a system for simulating time domain responses of information handling systems and subsystems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is sometimes desirable to simulate the time domain response of IHSs in order to, for example, analyze or model components and/or channels in the IHS. However, with the increasing signal speeds associated with, for example, high speed serial data links, simulation and modeling of components and/or channels becomes more challenging. Typically, the metric used for validating a high speed link channel from a Signal Integrity perspective is Bit Error Rate (BER), while Eye Height (EH) and Eye Width (EW) are used to determine the quality of an interface for a given set of design parameters and frequency of operation. However, BER, EH, and EW estimation require Time Domain (TD) simulations of complex channel models over billions of bits, which is a time, compute power, and memory intensive process. Several techniques involving statistical and/or optimization algorithms have been introduced to reduce the set of designs that need to be simulated. For example, the Design of Experiments (DoE) technique is one of the most common of such techniques. However, DoE-based simulations have been found to result in inaccurate sensitivity analysis of the channel performance to design variables. Furthermore, the size of a DoE set scales exponentially with the number of design variables.

Accordingly, it would be desirable to provide an improved system for simulating the time domain response of an IHS.

SUMMARY

According to one embodiment, a time domain response simulation system includes a simulation variable subsystem that is configured to receive a plurality of variables for a simulated system; a frequency domain simulation engine that is configured to perform a frequency domain simulation over a plurality of different frequencies using each of the plurality of variables for the simulated system to provide a plurality of simulated frequency domain responses for the simulated system; a time domain simulation engine that is configured to perform a time domain simulation over the plurality of different frequencies using a subset of the plurality of simulated frequency domain responses for the simulated system to produce a plurality of simulated time domain responses for the simulated system; a mapping engine that is configured to map the subset of the plurality of simulated frequency domain responses for the simulated system to the plurality of simulated time domain responses for the simulated system to produce a frequency-domain-to-time-domain mapping; and an prediction engine that is configured to determine a plurality of mapped time domain responses for the simulated system using the frequency-domain-to-time-domain mapping to, wherein the plurality of simulated time domain responses and the plurality of mapped time domain responses provide time domain responses for each of the plurality of variables for the simulated system.

BRIEF DESCRIPTION OF THE DRAWINGS

FIG. 3b is a graph illustrating an embodiment of the actual time domain response of the simulated system of FIG. 3a.

FIG. 9c is a graph illustrating an experimental embodiment of the comparison of a time domain simulation of eye height according to the present disclosure with a brute force simulation of eye width according to the prior art.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
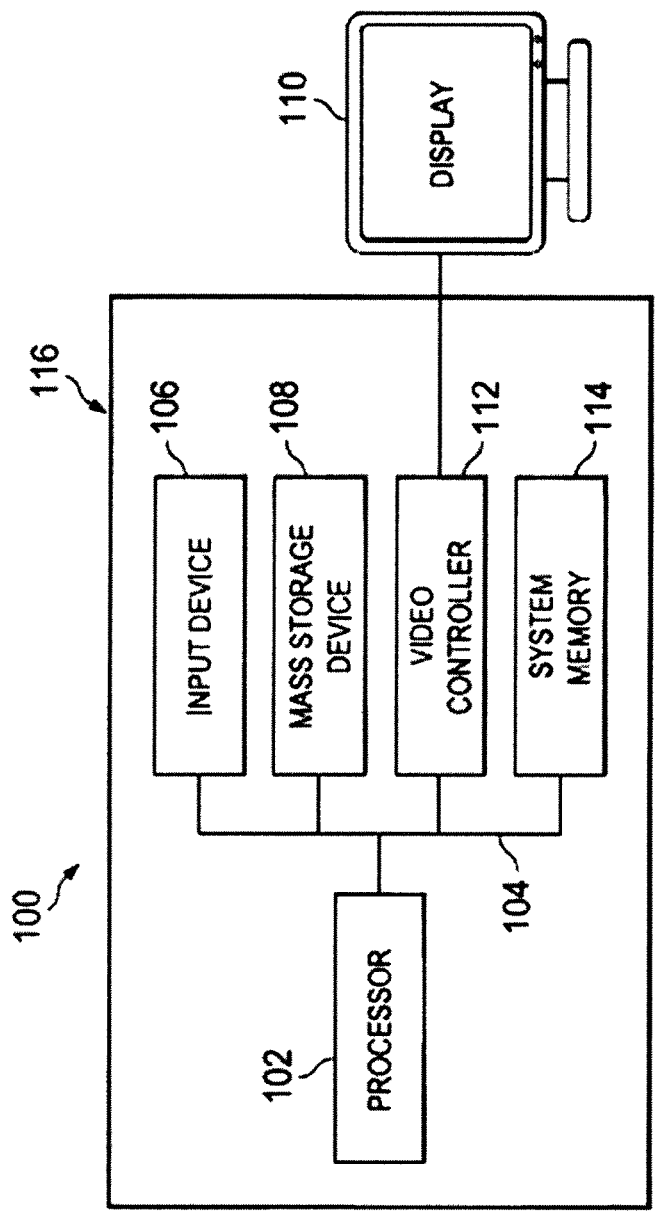
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
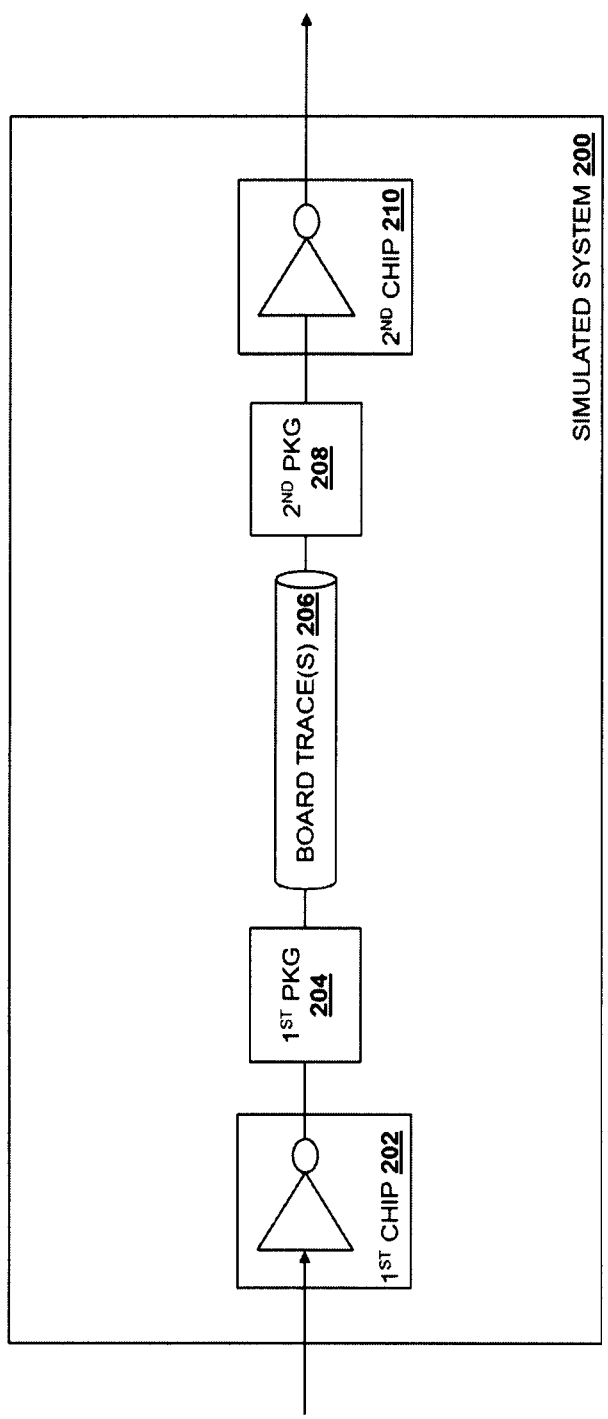
FIG. 2 is a schematic view illustrating an embodiment of a simulated system.

Referring now to FIG. 2, an embodiment of a simulated system 200 is illustrated. In some embodiments, the simulated system 200 may be the IHS 100 discussed above with reference to FIG. 1 and/or may include some or all of the components of the IHS 100. The simulated system 200 includes a first chip 202 coupled to a first package 204. The first package 204 is coupled through one or more board traces 206 to a second package 208. The second package 208 is coupled to a second chip 210. One of skill in the art in possession of the present disclosure will recognize that the embodiment of the simulated system 200 illustrated in FIG. 2 is greatly simplified to provide an example of a system that may be simulated according to the teachings of the present disclosure, and a wide variety of additional and different components will typically be included in simulated systems that provide more complex systems that will fall within the scope of the present disclosure. For example, chip process variables may include supply voltage $V_{DD}$, junction thickness $T_J$, oxide thickness $T_{OX1}$ (thin), dielectric constant $E_R$ (thick), oxide thickness $T_{OX2}$ (thick), length/width ratio NMOS FET $(L/W)_N$, length/width ratio NMOS FET $(L/W)_P$, doping ration $N_p$, doping ratio $N_N$, width/thickness ratio $(W/T)_{Poly}$, width/thickness ratio $(W/T)_{M1 \ldots M5}$, conductivity $Rho_{M1 \ldots M5}$, and/or a variety of other chip process variables known in the art. Package and board process variables may include thickness $T_{E1}$, dielectric constant $E_{R1}$, thickness $T_{D2}$, dielectric constant $E_{R2}$, width minus thickness $(W-T)_M$, conductivity $Rho_M$, rise time, fall time, driver output voltage, pad capacitance, impedance variation, and/or a variety of other package and board process variables known in the art. The design space equals $X^N$, where X is the number of variations of each variable (e.g., impedance may include 3 variations such as minimum impedance, typical impedance, and maximum impedance; driver output voltage may include many variations such as 1.1 volts, 1.2 volts, 1.3 volts, etc.) and N is the number of parameters. For a simulated system with X=3 and a first chip 202 with N=20, the design space is $10^{10}$, and as the number of variables and associated variations increase, the simulation space becomes very large.

As discussed above, validating a high speed link channel from a signal integrity perspective and/or otherwise predicting the quality of an interface for a given set of design parameters and frequency of operation typically involves estimation of the Bit Error Rate (BER), Eye Height (EH) and Eye Width (EW), which involves Time Domain simulations of complex channel models over billions of bits. With high speed channels becoming more complex with more variables such as length, impedance, temperature, process voltage, termination, and/or other variables known in the art, time domain simulations become more difficult and time consuming to perform. The Design of Experiments (DoE) technique involves statistical and/or optimization algorithms that reduce the set of designs that need to be simulated. The DoE technique uses orthogonal vectors in a multi-dimensional design space to generate a design set that would cover the entire design space (e.g., the DoE technique is performed over a reduced subset of the variables in the simulated system), and Response Surface Method (RSM) is then used to fit the DoE-based designs to predict EH and EW (e.g., use RSM to interpolate the response of the simulated system considering all of its variables). A simplified example of this process may include a simulated system with variables A-Z, with each variable including 3 variations (e.g., A includes $A_1$, $A_2$, and $A_3$, B includes $B_1$, $B_2$, and $B_3$, etc.). The DoE technique may involve picking random variable variations (e.g., $C_3$, $H_1$, $W_2$, etc.) and running a number of experiments (e.g., 100 experiments) using those variable variations. RSM may then be used with those results to determine a function, and the variables A-Z of the simulated system may then be plugged into the function many times (e.g., thousands of times) to produce results that describe the estimated time domain response of the simulated system.

Figure 3A:
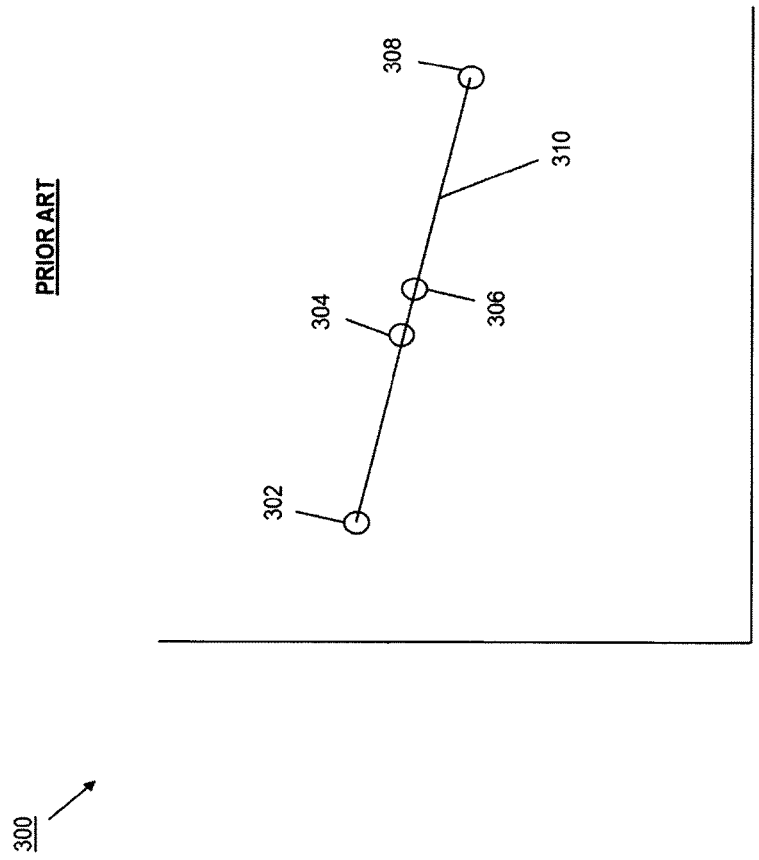
FIG. 3a is a graph illustrating an embodiment of a prior art result for simulating the time domain response of a simulated system.
Figure 3B:
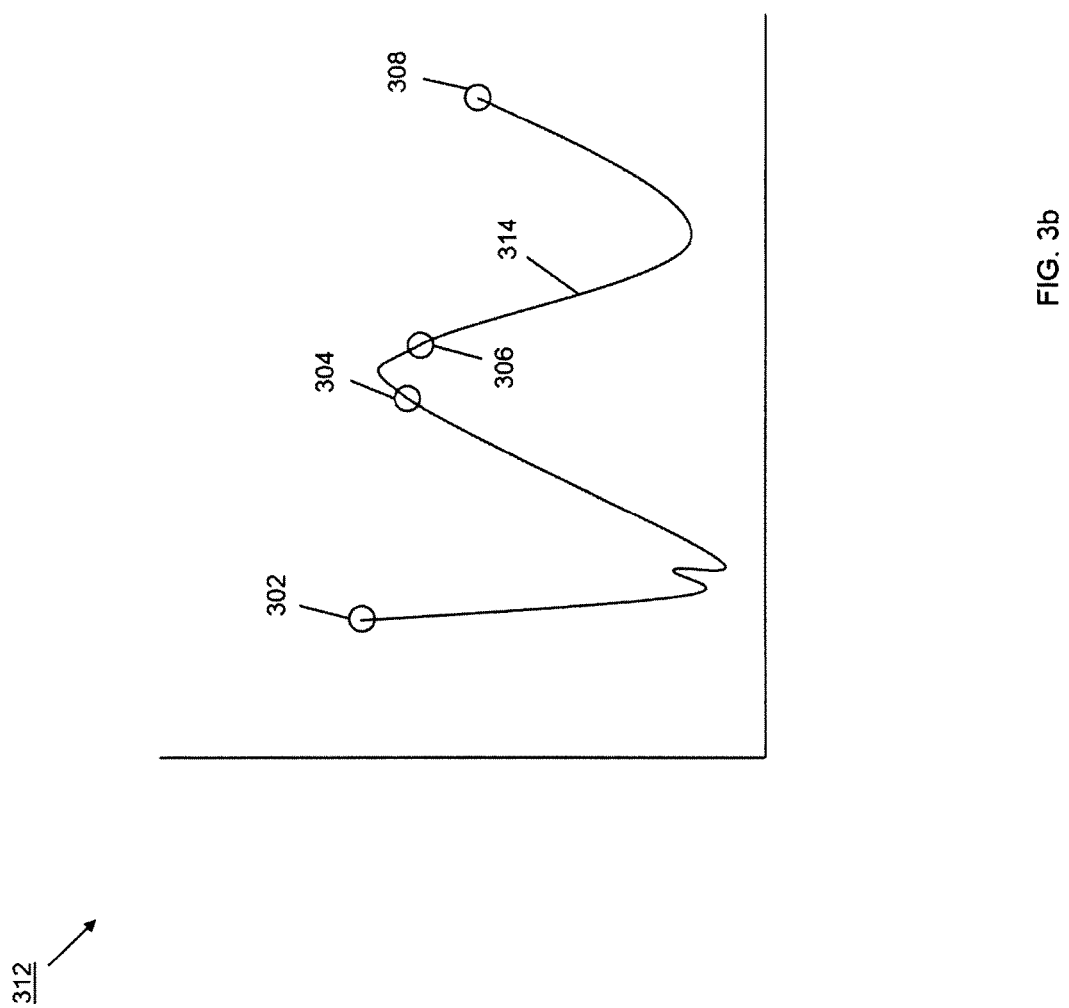

FIG. 3a illustrates an experimental embodiment 300 of a simulated time domain response that was created using the prior art techniques discussed above. In the experimental embodiment of FIG. 3a, an eye sensitivity time domain response was estimated. The DoE technique resulted in calculated points 302, 304, 306 and 308, and RSM provided a function including those calculated points that resulted in the linear simulated eye sensitivity time domain response function 310. FIG. 3b illustrates an experimental embodiment 312 of the actual eye sensitivity time domain response of the simulated system. As can be seen, the experimental embodiment 312 of the actual eye sensitivity time domain response includes the calculated points 302, 304, 306 and 308 illustrated in the estimated time domain response of FIG. 3a, but shows the actual eye sensitivity time domain response 314 is non-linear between the calculated points 302, 304, 306 and 308. FIGS. 3a and 3b illustrates how prior art techniques for simulating time domain response such as DoE techniques and RSM can provide inaccurate sensitivity analysis of channel performance (e.g., EH and EW) to design variables when compared to a full-factorial sweep (e.g., a simulation considering all variables in the simulated system) across all possible design and process variations. Going forward, there is a need to perform full-factorial analysis of high speed channels to ensure that they are designed properly and robustly.

Figure 4:
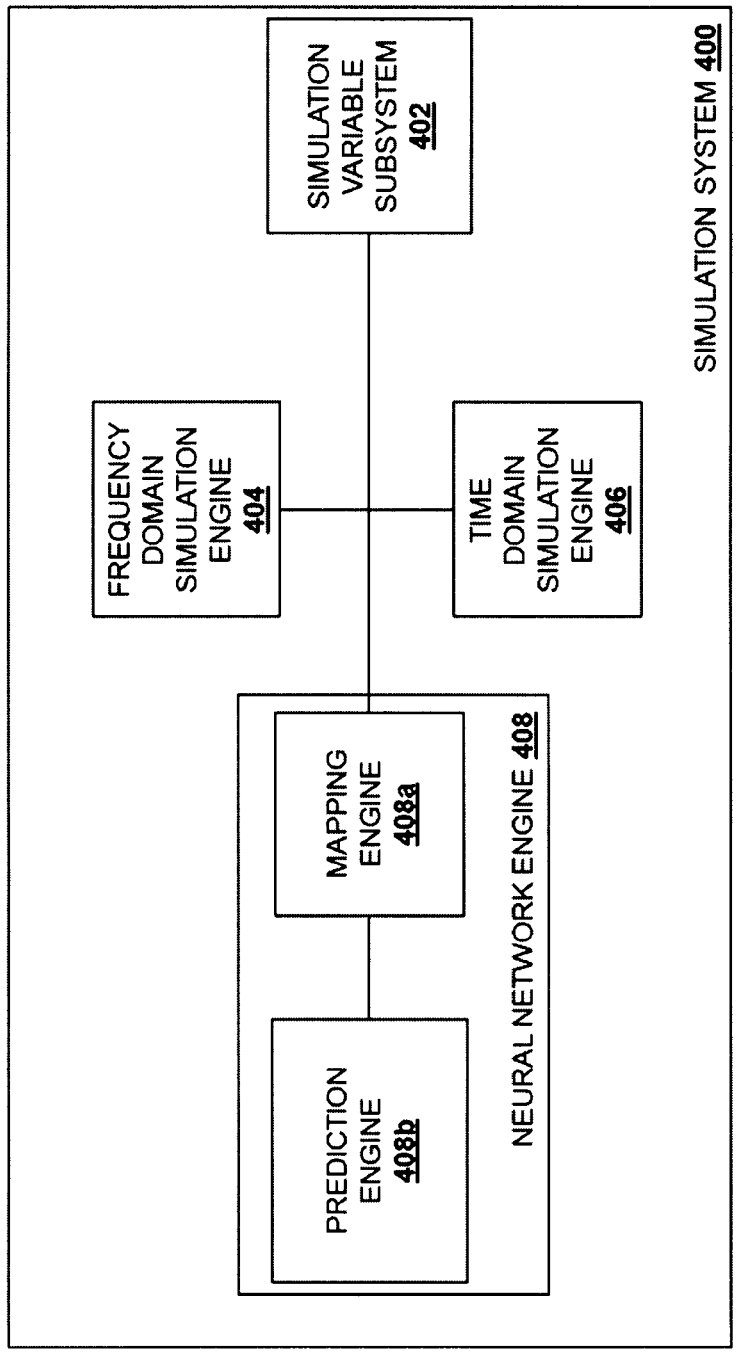
FIG. 4 is a schematic view illustrating an embodiment of a simulation system.

Referring now to FIG. 4, an embodiment of a simulation system 400 according to the teachings of the present disclosure is illustrated. In some embodiments, the simulation system 400 may be the IHS 100 discussed above with reference to FIG. 1 and/or may include some or all of the components of the IHS 100. While illustrated as a single system, the simulation system 400 may be provided as a distributed system and/or have its functionality enabled by a plurality of networked systems. The simulation system 400 includes a simulation variable subsystem 402 that is configured to receive simulation variables for a simulated system. For example, the simulation variable subsystem 402 may include one or more input devices, a communication interface, a storage system, and/or any other components needed for receiving variables for a simulated system, providing those variables to the other components of the simulation system 400, and/or providing any other functionality of the simulation variable subsystem 402 discussed below. The simulation variable subsystem 402 is coupled to each of a frequency domain simulation engine 404 and a time domain simulation engine 406.

In an embodiment, the simulation system 400 includes a processing system (not illustrated, but similar to the processor 102 discussed above with reference to FIG. 1, and which may be coupled to the simulation variable subsystem 402) and a memory system (not illustrated, but similar to the system memory 114 discussed above with reference to FIG. 1) that includes instructions that, when executed by the processing system, cause the processing system to simulate a frequency domain response of a simulated system and/or perform any of the other functions of the frequency domain simulation engine 404 discussed below. In an embodiment, the simulation system 400 includes a processing system (not illustrated, but similar to the processor 102 discussed above with reference to FIG. 1, and which may be coupled to the simulation variable subsystem 402) and a memory system (not illustrated, but similar to the system memory 114 discussed above with reference to FIG. 1) that includes instructions that, when executed by the processing system, cause the processing system to simulate a time domain response of a simulated system and/or perform any of the other functions of the time domain simulation engine 406 discussed below.

In the illustrated embodiment, the simulation variable subsystem 402, the frequency domain simulation engine 404, and the time domain simulation engine 406 are coupled to a neural network engine 408 that includes a mapping engine 408a and a prediction engine 408b. In an embodiment, the simulation system 400 includes a processing system (not illustrated, but similar to the processor 102 discussed above with reference to FIG. 1, and which may be coupled to the simulation variable subsystem 402, the processing system that provides the frequency domain simulation engine 404, and the processing system that provides the time domain simulation engine 406) and a memory system (not illustrated, but similar to the system memory 114 discussed above with reference to FIG. 1) that includes instructions that, when executed by the processing system, cause the processing system to provide an Artificial Neural Network (ANN) that performs any of the other functions of the neural network engine 408 discussed below. The functions performed by the neural network engine 408 include a mapping function provided by the mapping engine 408a and a prediction function provided by the prediction engine 408b. However, in other embodiments, the mapping engine 408a and prediction engine 408b may be provided without the neural network engine 408 (e.g., via respective processing systems and memory systems similarly as discussed above) while remaining within the scope of the present disclosure. Thus, in some embodiments, the functionality of the mapping engine 408a and the prediction engine 408b may be enabled by the neural network engine 408, while in other embodiments, the functionality of the mapping engine 408a and the prediction engine 408b may be enabled without the use of the neural network engine 408.

Figure 5:
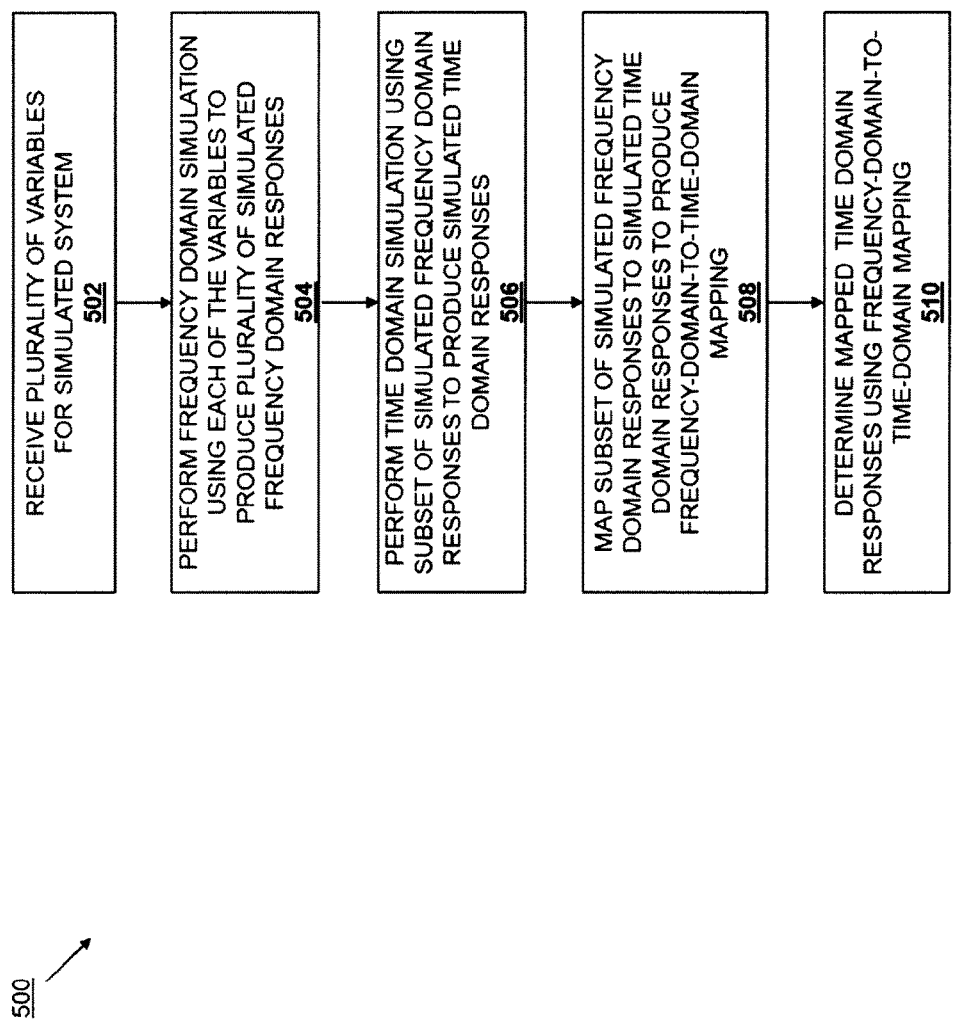
FIG. 5 is a flow chart illustrating an embodiment of a method for simulating time domain responses.

Referring now to FIG. 5, an embodiment of a method 500 for simulating time domain responses is illustrated. In the embodiments discussed below, the simulation system 400 of FIG. 4 performs the method 500 to conduct frequency domain simulations using each of the variables in a simulated system in order to produce a plurality of simulated frequency domain responses for the simulated system, and then conducts time domain simulations using a subset of the plurality of simulated frequency domain responses to produce a plurality of simulated time domain responses for the simulated system. The simulation system 400 then maps the subset of the plurality of simulated frequency domain responses to the plurality of the plurality of simulated time domain responses to produce a frequency-domain-to-time-domain mapping, and uses the frequency-domain-to-time-domain mapping to determine a plurality of mapped time domain responses for the simulated system. The plurality of the simulated time domain responses and the plurality of mapped time domain responses provide time domain responses for each of the variables in the simulated system, and this time domain simulation/mapping technique been found in experimental embodiments to correlate closely with brute force calculation of time domain simulations while greatly reducing the time needed to simulate such time domain responses, as discussed in further detail below.

Figure 6:
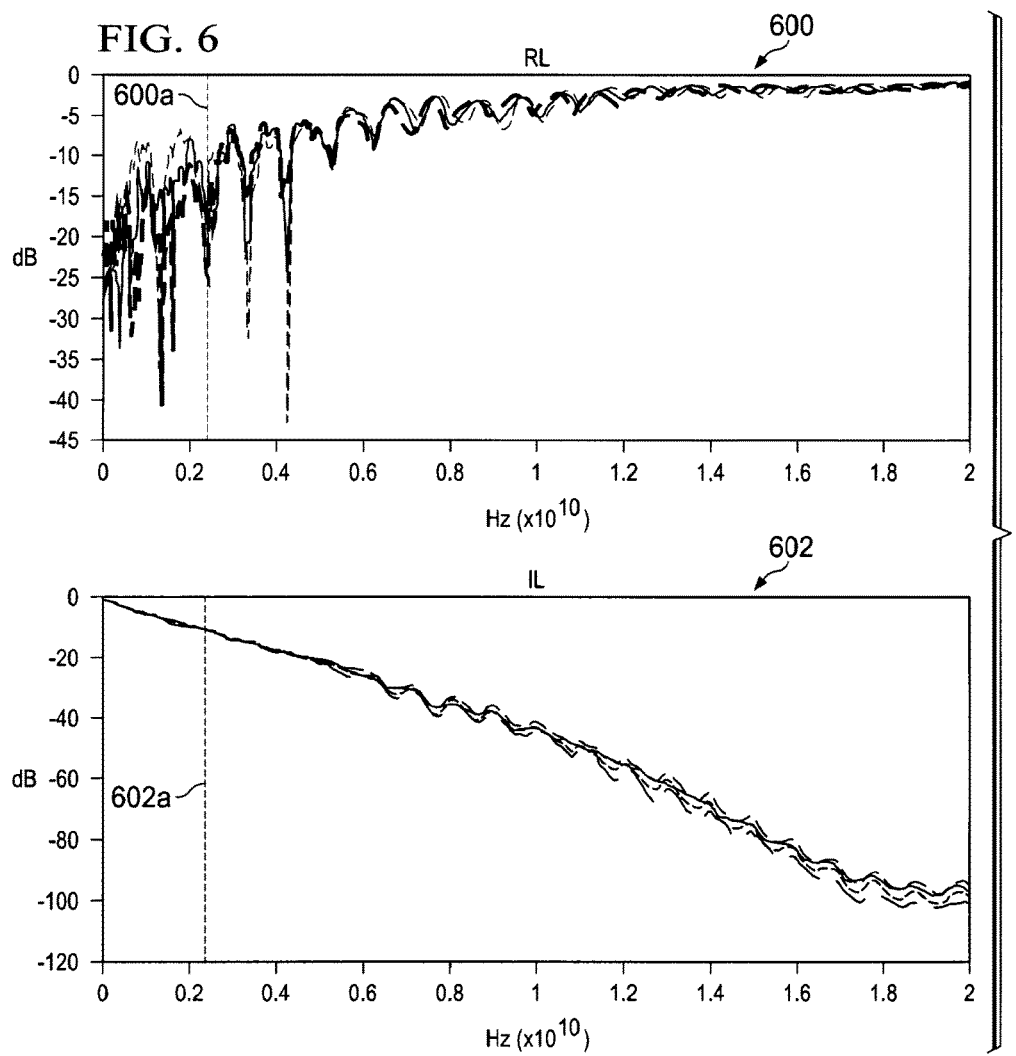
FIG. 6 is a graph illustrating an embodiment of a simulated frequency domain response of a simulated system.

As discussed above, performing time domain simulations for a full-factorial sweep of a simulated system (e.g., considering all the variables in a simulated system) takes an excessive amount of time (e.g., sometimes months to years). Frequency domain simulations for a full-factorial sweep of a simulated system take a fraction of the time needed for time domain simulations, but are not able to provide eye opening behavior responses such as time domain eye height responses and time domain eye width responses. FIG. 6 illustrates an experimental embodiment in which frequency domain responses were simulated for a full-factorial sweep of a Serial Attached Small Computer System Interface (SCSI) (SAS) server system. The simulated frequency domain responses illustrate a return loss response 600 and an insertion loss response 602. Chart A, below, illustrates some simulated time domain responses for the simulated frequency domain responses:

CHART A

| Eye-Height (mv) | Return Loss (dB) | | | | Insertion Loss (dB) | | | |
|---|---|---|---|---|---|---|---|---|
| | 1 GHz (f1) | 3 GHz (f2) | 6 GHz (f3) | 9 GHz (f4) | 1 GHz (f1) | 3 GHz (f2) | 6 GHz (f3) | 9 GHz (f4) |
| 168 | −8.43372 | −8.27201 | −5.02066 | −4.67226 | −6.08148 | −14.0209 | −27.1351 | −38.6785 |
| 188 | −13.4915 | −8.20516 | −6.9285 | −4.3395 | −5.61247 | −14.0046 | −25.6731 | −37.0642 |
| 201 | −10.5143 | −6.13011 | −5.54731 | −5.34994 | −5.55142 | −14.464 | −25.9538 | −37.0096 |
| 214 | −9.99166 | −6.05457 | −5.5201 | −5.35206 | −5.53588 | −14.0532 | −24.6902 | −35.7722 |

As can be seen in chart A, there is a relatively large variation (approximately 50 mV) in simulated time domain eye height responses for SAS channels having similar frequency domain characteristics, which illustrates how a mapping from frequency domain to time domain may be highly non-linear. In some embodiments of the present disclosure, a training set of simulated frequency domain responses and simulated time domain responses are provided to an ANN, and the ANN is used to map the simulated frequency domain responses to the simulated time domain responses in order to capture the non-linear relationship between the two such that the remaining time domain responses (i.e., those that were not simulated for the mapping) may be determined without the associated inaccuracy present in prior art methods. As discussed below, such time domain simulation methods remain constant over increasing design variables, and scale only in the number of frequency domain variables that are used to map the time domain variables, and the chosen sampling in the frequency domain.

The method 500 begins at block 502 where a plurality of variables are received for a simulated system. In an embodiment, the simulated variable subsystem 402 in the simulation system 400 receives a plurality of variables for a simulated system such as, for example, the simulated system 300 (e.g., chip process variables $V_{DD}$, $T_J$, $T_{OX}$ (thin), $E_R$ (thick), $T_{OX}$ (thick), $(L/W)_N$, $(L/W)_P$, $N_P$, $N_N$, $(W/T)_{Poly}$, $(W/T)_{M1\ldots M5}$, $Rho_{M1\ldots M5}$, and/or other chip process variables known in the art, package and board process variables $T_{E1}$, $E_{R1}$, $T_{D2}$, $E_{R2}$, $(W-T)_M$, $Rho_M$, and/or other package and board process variables known in the art, etc.). In an embodiment, a user or users may provide the variables for the simulated system to the simulation variable subsystem 402 via an input device included in the simulation variable subsystem 402, via a communication interface in the simulation variable subsystem 402, and/or any other method known in the art. Furthermore, at block 502 the simulation variable subsystem 402 may receive any variable associated with the frequency domain response and/or time domain response of a system that a user wishes to simulate, as the simulation systems and methods of the present disclosure allow for consideration of all variables of a simulated systems.

The method 500 then proceeds to block 504 where a frequency domain simulation is performed using each of the variables for the simulated system, and a plurality of simulated frequency domain responses are produced. In an embodiment, at block 504, the simulation variable subsystem 402 may be configured to provide each of the plurality of variables for the simulated system to the frequency domain simulation engine 404, or the frequency domain simulation engine 404 may be configured to retrieve each of the plurality of variables for the simulated system from the simulation variable subsystem 402. At block 504, the frequency domain simulation engine 404 uses each of the variables for the simulated system to perform a frequency domain simulation and provide a plurality of simulated frequency domain responses for the simulated system. In an embodiment, the frequency domain simulation engine 404 may operate at block 504 to perform a full factorial frequency domain simulation for all of the variables in the simulated system over all frequencies of interest. One of skill in the art will recognize that "frequencies of interest" may include any frequencies at which the simulated system operates such as, for example, all the frequencies that cover a signal energy spectrum that includes the Nyquist frequency for the signal and all of its harmonics. In a specific example, referring back to FIG. 6, the return loss response 600 and the insertion loss response 602 provide an example of simulated frequency domain responses over a frequency range of 0 Hz to $2\times10^{10}$ Hz. While in the examples herein, the simulated frequency domain response is illustrated and discussed as the return loss response 600 and the insertion loss response 602, one of skill in the art in possession of the present disclosure will recognize that any frequency domain response may be used while remaining within the scope of the present disclosure.

The method 500 then proceeds to block 506 where a time domain simulation is performed using a subset of the plurality of simulated frequency domain responses that were produced at block 504, and a plurality of simulated time domain responses are produced. In an embodiment, at block 506, the frequency domain simulation engine 404 may be configured to provide a subset of the simulated frequency domain responses to the time domain simulation engine 406. In another embodiment, the time domain simulation engine 406 may be configured to retrieve a subset of the simulated frequency domain responses from the frequency domain simulation engine 404. At block 506, the time domain simulation engine 406 uses data from the subset of the plurality of simulated frequency domain responses of the simulated system to perform time domain simulations and produce the plurality of simulated time domain responses for the simulated system. For example, referring back to FIG. 6, the return loss response 600 includes a selected frequency line 600a at a selected frequency of approximately $0.24\times10^{10}$ Hz, and the insertion loss response 602 includes a selected frequency line 602a at a selected frequency of approximately $0.24\times10^{10}$ Hz. Each of the selected frequency lines 600a and 602a may be associated with a range of simulated frequency responses at the selected frequency (e.g., in the illustrated embodiment, the range of simulated frequency responses is relatively larger for the return loss response 600 at the selected frequency due to the relatively large spike in return loss response over a wider range of decibels at the selected frequency, while the range of simulated frequency responses is relatively smaller for insertion loss response 602 at the selected frequency).

In one example of block 506, the data from subset of the simulated frequency responses used by the time domain simulation engine 406 to perform the time domain simulation may includes the maximum simulated frequency response, the minimum simulated frequency response, and the average simulated frequency response at one or more selected frequencies. For example, referring back to Chart A above, at a selected frequency f1 of 1 GHz, the simulated time domain eye height response of 168 mV is associated with a simulated frequency domain return loss response −8.43372 dB and a simulated frequency domain insertion loss response of −6.08148 dB, the simulated time domain eye height response of 188 mV is associated with a simulated frequency domain return loss response −13.4915 dB and a simulated frequency domain insertion loss response of −5.61247 dB, the simulated time domain eye height response of 201 mV is associated with a simulated frequency domain return loss response −10.5143 dB and a simulated frequency domain insertion loss response of −5.55142 dB, and the simulated time domain eye height response of 214 mV is associated with a simulated frequency domain return loss response −9.99166 dB and a simulated frequency domain insertion loss response of −5.53588 dB. While examples of maximum, minimum, and average simulated frequency domain responses are illustrated in FIG. 6 and described above, one of skill in the art in possession of the present disclosure will recognize that data from different subsets of the simulated frequency domain responses may be used to perform the time domain simulation to produce the plurality of simulated time domain responses at block 506 while remaining within the scope of the present disclosure.

The method 500 then proceeds to block 508 where the subset of simulated frequency responses are mapped to the plurality of simulated time domain responses to produce a frequency-domain-to-time-domain mapping. In an embodiment of block 508, the neural network engine 408 and/or the mapping engine 408a operate at block 508 to map the subset of simulated frequency responses (that were used to produce the plurality of simulated time domain responses at block 506) to the plurality of simulated time domain responses (produced at block 506) to produce a frequency-domain-to-time-domain mapping. In an embodiment, at block 508, the frequency domain simulation engine 404 may be configured to provide the subset of the simulated frequency domain responses to the neural network engine 408 and/or the mapping engine 408a, and the time domain simulation engine 406 may be configured to provide the plurality of the simulated time domain responses to the neural network engine 408 and/or the mapping engine 408a. In another embodiment, the neural network engine 408 and/or the mapping engine 408a may be configured to retrieve the subset of the simulated frequency domain responses from the frequency domain simulation engine 404 and the plurality of simulated time domain responses from the time domain simulation engine 406.

Figure 7:
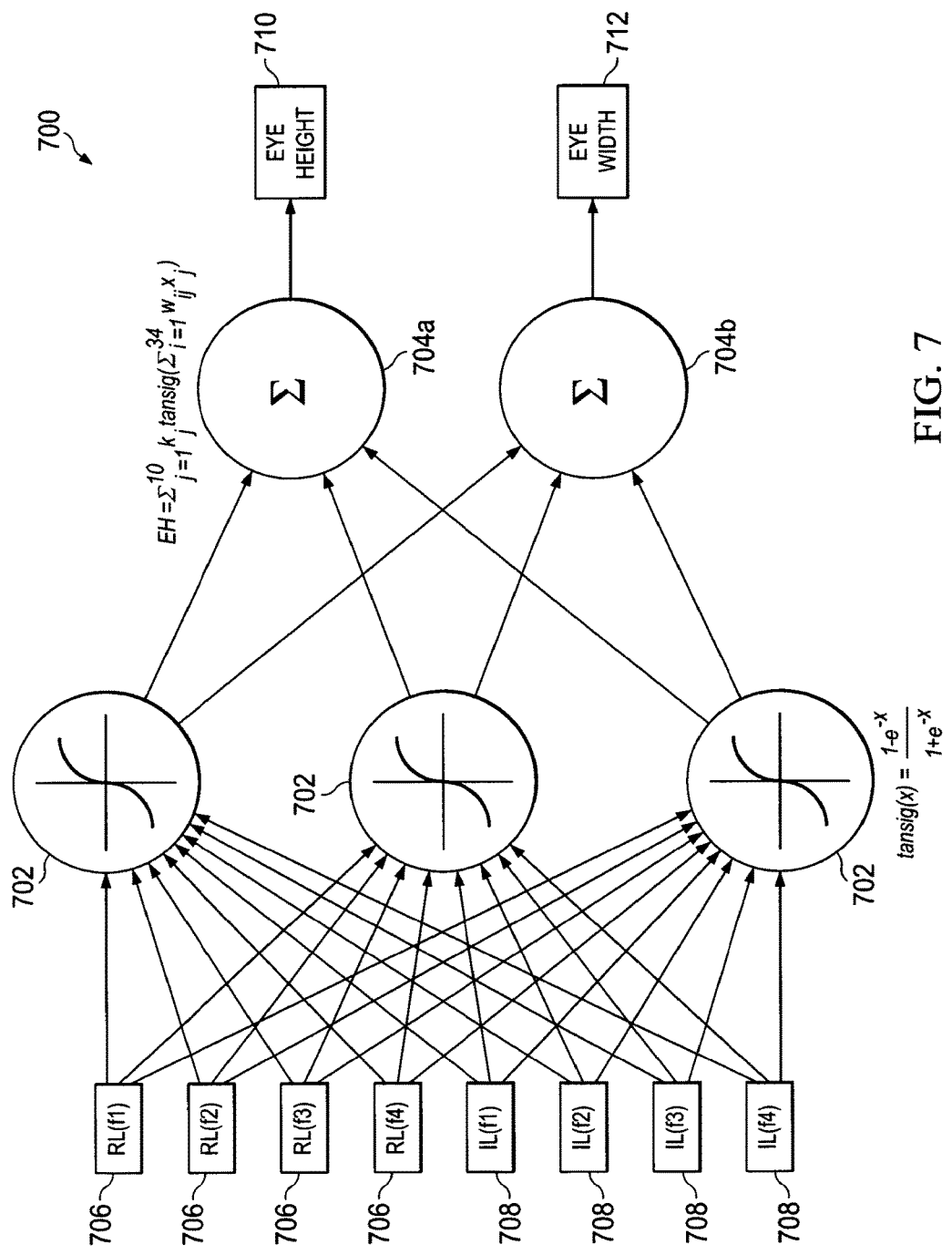
FIG. 7 is a schematic view illustrating an embodiment of a neural network engine mapping a frequency domain response to a time domain response.

Referring now to FIG. 7, an embodiment of a neural network engine 700, which may be the neural network engine 408 discussed above with reference to FIG. 4, is illustrated performing the mapping function of the mapping engine 408a discussed above with reference to FIG. 4. In the illustrated embodiment, the neural network engine 700 includes a plurality of non-linear recognition subsystems 702 that are configured to recognize non-linear relationships, and that may utilize a tansig function such as tansig $(x)=(1-e^{-x})/(1+e^{-x})$, as illustrated. The neural network engine 700 in the illustrated embodiment also includes an eye height summation subsystem 704a that is configured to sum weights and the tansig function results from the non-linear recognition subsystems 702 using a summation equation such as:

$$EH = \Sigma_{j=1}^{10} k_j \, \text{tansig}(\Sigma_{i=1}^{34} w_{ij} x_j)$$

The neural network engine 700 in the illustrated embodiment also includes an eye width summation subsystem 704b that is configured to sum weights and the tansig function results from the non-linear recognition subsystems 702 using a summation equation similar to that used by the eye height summation subsystem 704a. While a few specific components are schematically illustrated and described to provide an example of the neural network engine 700, one of skill in the art will recognize that an ANN may include may additional and/or different component that may utilize different techniques to perform the functions of the neural network engine 700 described herein while remaining within the scope of the present disclosure.

FIG. 7 illustrates a specific example of how the subset of simulated frequency responses (e.g., the simulated frequency domain return loss responses and the simulated frequency domain insertion loss responses in Chart A) above may be mapped to the plurality of simulated time domain responses (e.g. the simulated time domain eye height responses in Chart A, above, and simulated time domain eye width responses, not explicitly detailed in a chart above) to produce a frequency-domain-to-time-domain mapping. As can be seen, a plurality of simulated frequency domain return loss responses 706 (e.g., the simulated frequency domain return loss responses illustrated in Chart A, above, at frequencies f1, f2, f3, and f4) and a plurality of simulated frequency domain insertion loss responses 708 (e.g., the simulated frequency domain insertion loss responses illustrated in Chart A, above, at frequencies f1, f2, f3, and f4) are provided to the non-linear recognition subsystems 702. As can also be seen, simulated time domain eye height responses 710 (e.g., the simulated time domain eye height responses illustrated in Chart A, above) are provided to the eye height summation subsystem 704a, and simulated time domain eye width responses 712 (not explicitly detailed in a chart above) are provided to the eye width summation subsystem 704b. At block 508, the neural network engine 700/408 and/or the mapping engine 408a operate to map the simulated frequency domain return loss responses 706 and the plurality of simulated frequency domain insertion loss responses 708 to the simulated time domain eye height responses 710 and the simulated time domain eye width responses 712 to produce a frequency-domain-to-time-domain mapping. In a specific embodiment, an ANN may use a back propagation algorithm to reduce the error between the mapped ANN results and the simulated time domain eye results, and to calculate neural network weights. In the event the error is significant (e.g., greater than 1%), then additional neural network hidden layers may be added, or more neurons may be added, and the same procedure may be repeated until a desired level of accuracy is achieved (e.g., error of less than 1%). Once the desired level of accuracy is achieved, the ANN may be considered "trained" and ready to test the remaining frequency domain data. In an embodiment, the frequency-domain-to-time-domain mapping includes a function or other mapping relationship that fits the simulated frequency domain return loss and insertion loss responses to the simulated time domain eye width and eye height responses.

The method 500 then proceeds to block 510 where a plurality of mapped time domain responses are determined using the frequency-domain-to-time-domain mapping. In an embodiment, the neural network engine 408 and/or the prediction engine 408b operate at block 510 to use the frequency-domain-to-time-domain mapping produced at block 508 to determine a plurality of mapped time domain responses such that the plurality of simulated time domain response produced at block 506 and the plurality of mapped time domain responses determined at block 510 provide time domain responses for each of the plurality of variables for the simulated system. For example, mapped time domain responses may be determined by using data from the simulated frequency domain responses with the frequency-domain-to-time-domain mapping. As such, the plurality of simulated time domain responses the plurality of mapped time domain responses may provide all time domain results for a full factorial sweep of the simulated system.

Figure 8:
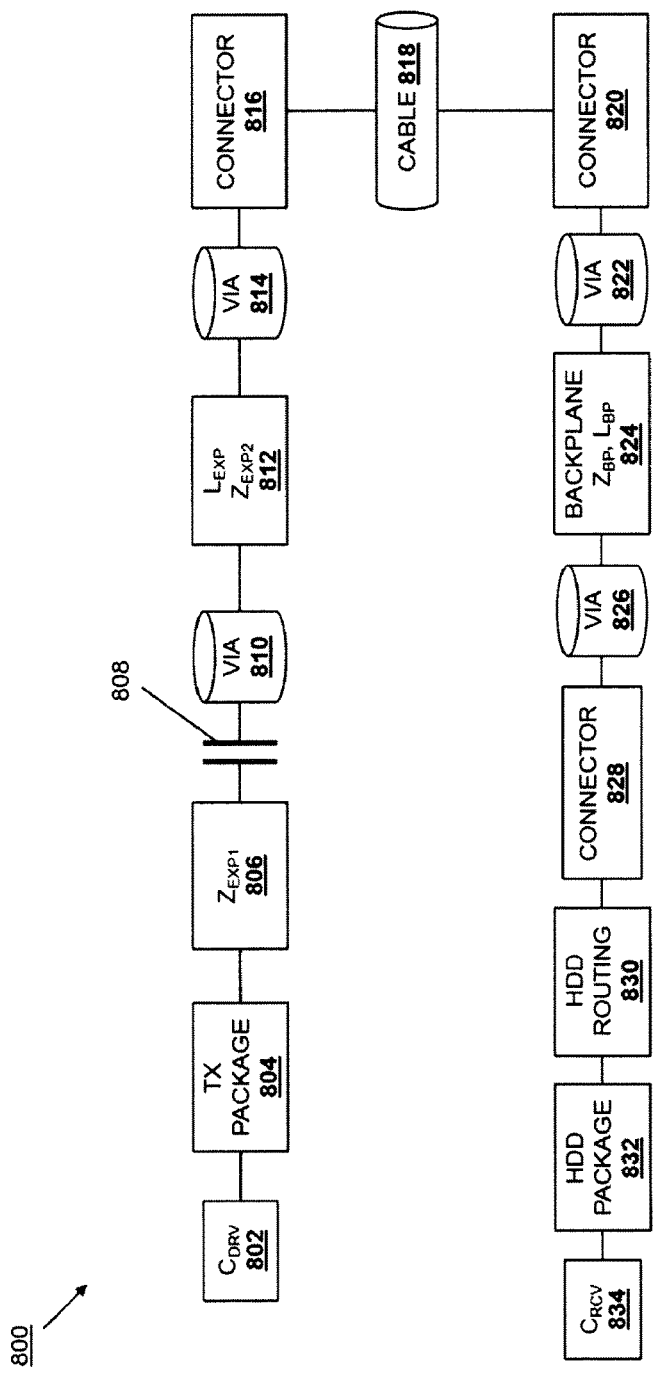
FIG. 8 is a schematic view illustrating an experimental embodiment of a simulated system.

Referring now to FIGS. 8 and 9a-f, an experimental embodiment of the method illustrated that demonstrates the benefits of the present disclosure. FIG. 8 illustrates a simulated system 800 that, in this experimental embodiment, was a Serial Advanced Technology Attachment (SATA) hard disk drive (HDD). The simulated system 800 of FIG. 8 illustrates SATA topology from the controller to the hard disk drive, and includes a driver capacitance $C_{drv}$ 802 (port termination) coupled to a transmission package 804. An expander impedance $Z_{exp1}$ 806 is coupled to the transmission package 804 and an Alternating Current (AC) coupling capacitor 808. A via 810 is coupled to the AC coupling capacitor 808 and an expander board length $L_{exp}$/expander impedance $Z_{exp2}$ 812. A via is coupled to the expander board length $L_{exp}$/expander impedance $Z_{exp2}$ 812 and a connector 816. A cable 818 couples the connector 816 to another connector 820. A via 822 couples the connector 820 to a backplane impedance $Z_{bp}$, backplane length $L_{bp}$ 824. A via coupled the backplane impedance $Z_{bp}$, backplane length $L_{bp}$ 824 and a connector 828. An HDD routing subsystem 830 couples the connector 828 to an HDD package 832. A receiver capacitance $C_{rcv}$ 834 (port termination) is coupled to the HDD package 832. As such, the simulated system 800 includes design variables such as driver capacitance $C_{drv}$, receiver capacitance ($C_{rcv}$), expander board length ($L_{exp}$), Back-plane length ($L_{bp}$), expander impedances ($Z_{exp1}$ and $Z_{exp2}$), and backplane impedance ($Z_{bp}$). Time domain simulations were performed, both using the method 500 discussed above, and using a "brute-force" calculation methods in which time domain responses were each calculated and carried out over relatively long periods of time. The results illustrated in FIGS. 9a-9f were achieved.

Figure 9A:
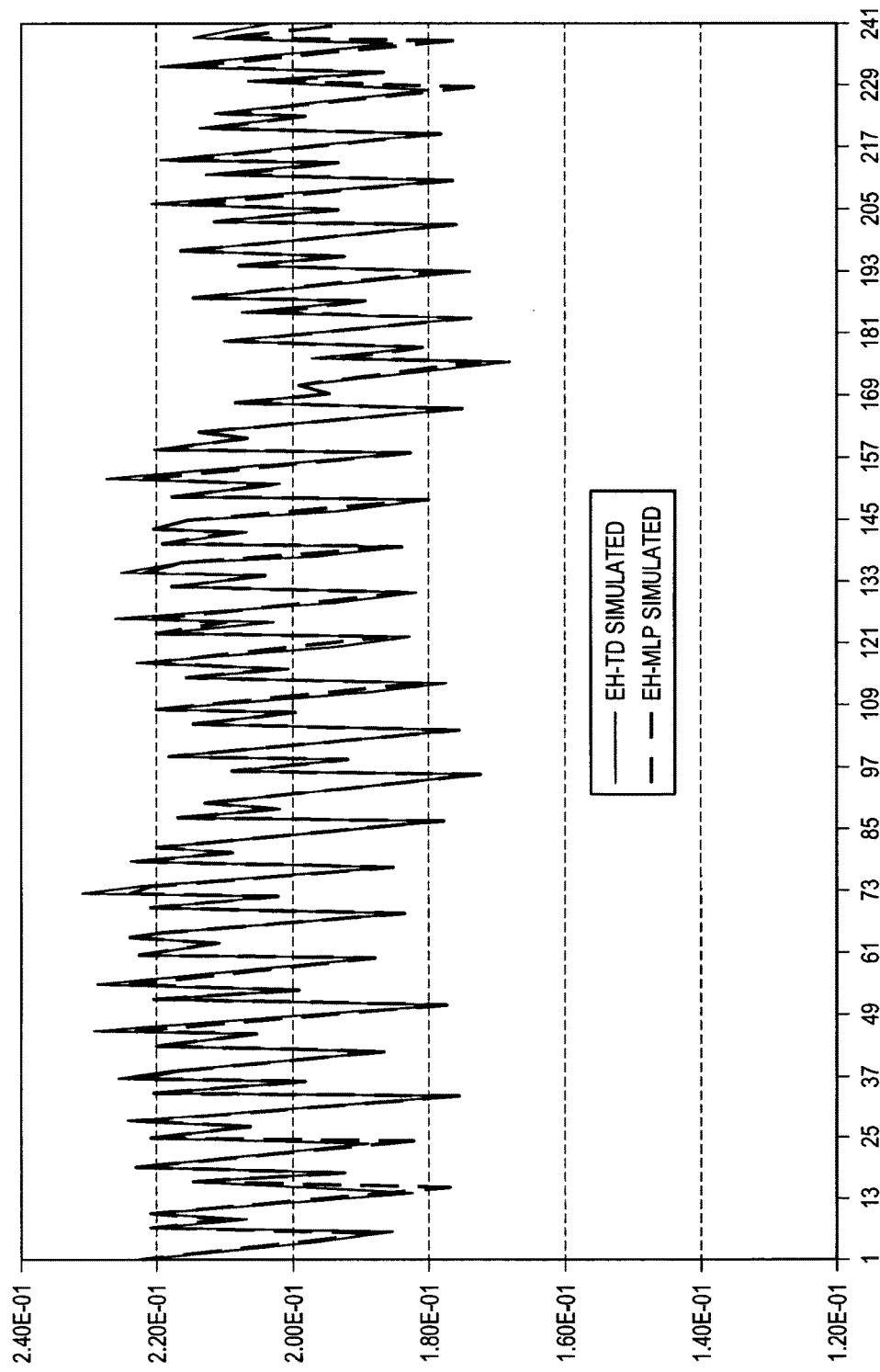
FIG. 9a is a graph illustrating an experimental embodiment of the comparison of a time domain simulation of eye height according to the present disclosure with a brute force simulation of eye width according to the prior art.
Figure 9B:
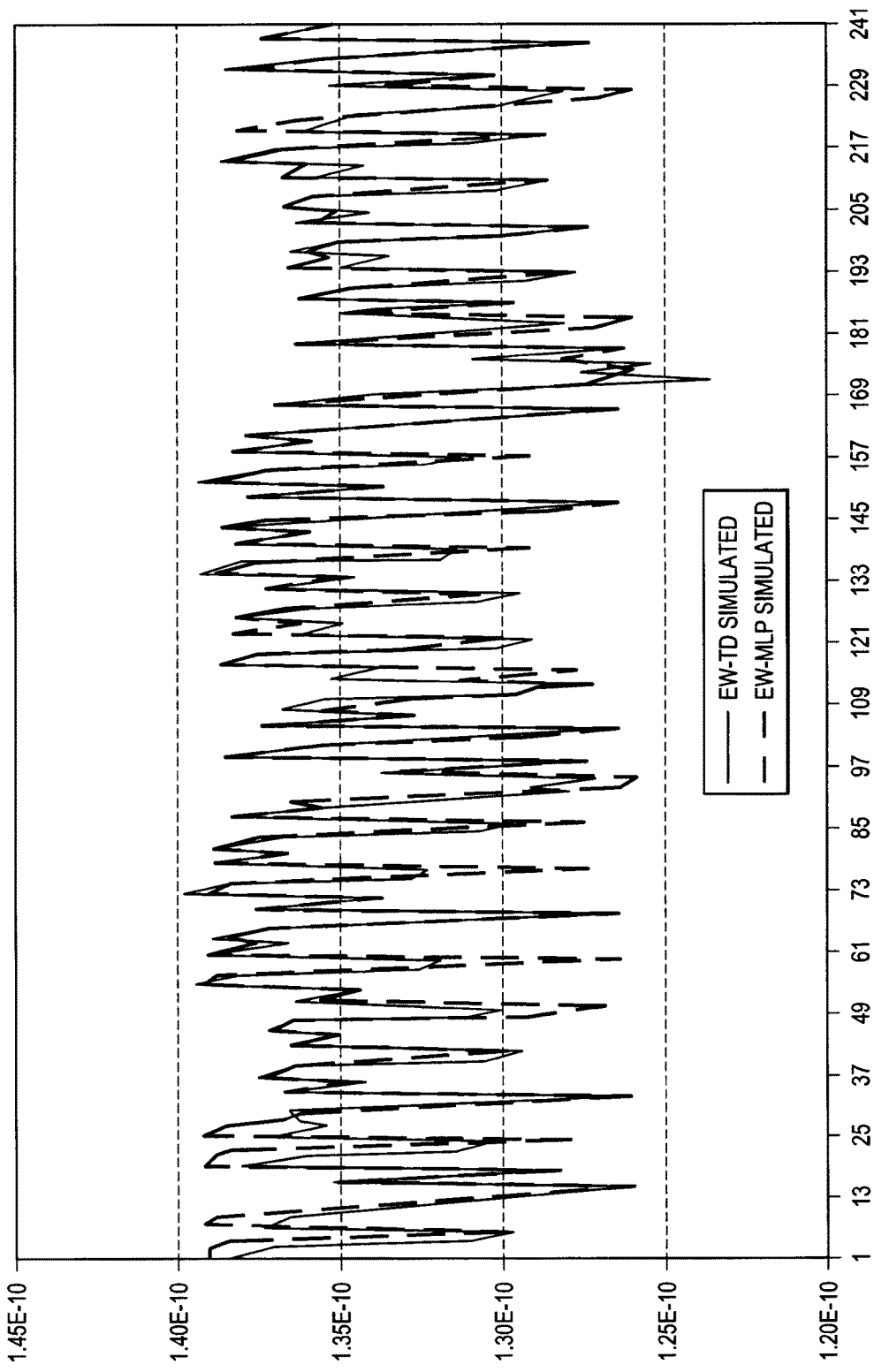
FIG. 9b is a graph illustrating an experimental embodiment of the comparison of a time domain simulation of eye width according to the present disclosure with a brute force simulation of eye width according to the prior art.

FIG. 9a illustrates time domain eye height responses for the simulated system 800 with an ANN training set size of 27 designs used with the systems and methods of the present disclosure, and a test set size of 243 designs used with brute force calculation simulation methods. As can be seen, the time domain eye height responses using the systems and methods of the present disclosure match closely with the simulated time domain eye height responses using brute force calculation simulation methods. FIG. 9b illustrates time domain eye width responses for the simulated system 800 with an ANN training set size of 27 designs used with the systems and methods of the present disclosure, and a test set size of 243 designs used with brute force calculation simulation methods. As can be seen, the time domain eye width responses using the systems and methods of the present disclosure match closely with the simulated time domain eye width responses using brute force calculation simulation methods.

Figure 9D:
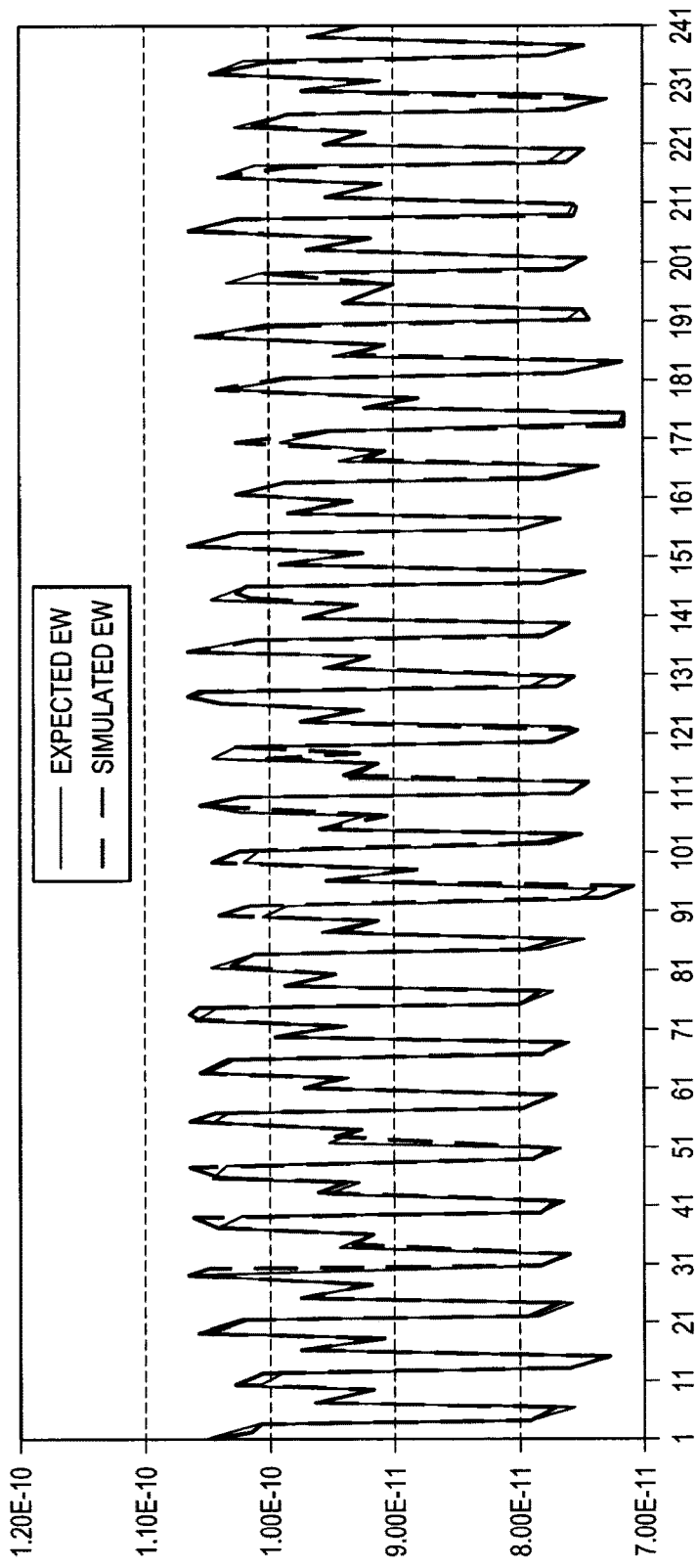
FIG. 9d is a graph illustrating an experimental embodiment of the comparison of a time domain simulation of eye width according to the present disclosure with a brute force simulation of eye width according to the prior art.

FIG. 9c illustrates time domain eye height responses for the simulated system 800 including 5 variables with cross talk with an ANN training set size of 51 designs used with the systems and methods of the present disclosure, and a test set size of 243 designs used with brute force calculation simulation methods. As can be seen, the time domain eye height responses using the systems and methods of the present disclosure match closely with the simulated time domain eye height responses using brute force calculation simulation methods. FIG. 9d illustrates time domain eye width responses for the simulated system 800 including 5 variables with cross talk with an ANN training set size of 51 designs used with the systems and methods of the present disclosure, and a test set size of 243 designs used with brute force calculation simulation methods. As can be seen, the time domain eye width responses using the systems and methods of the present disclosure match closely with the simulated time domain eye width responses using brute force calculation simulation methods.

Figure 9E:
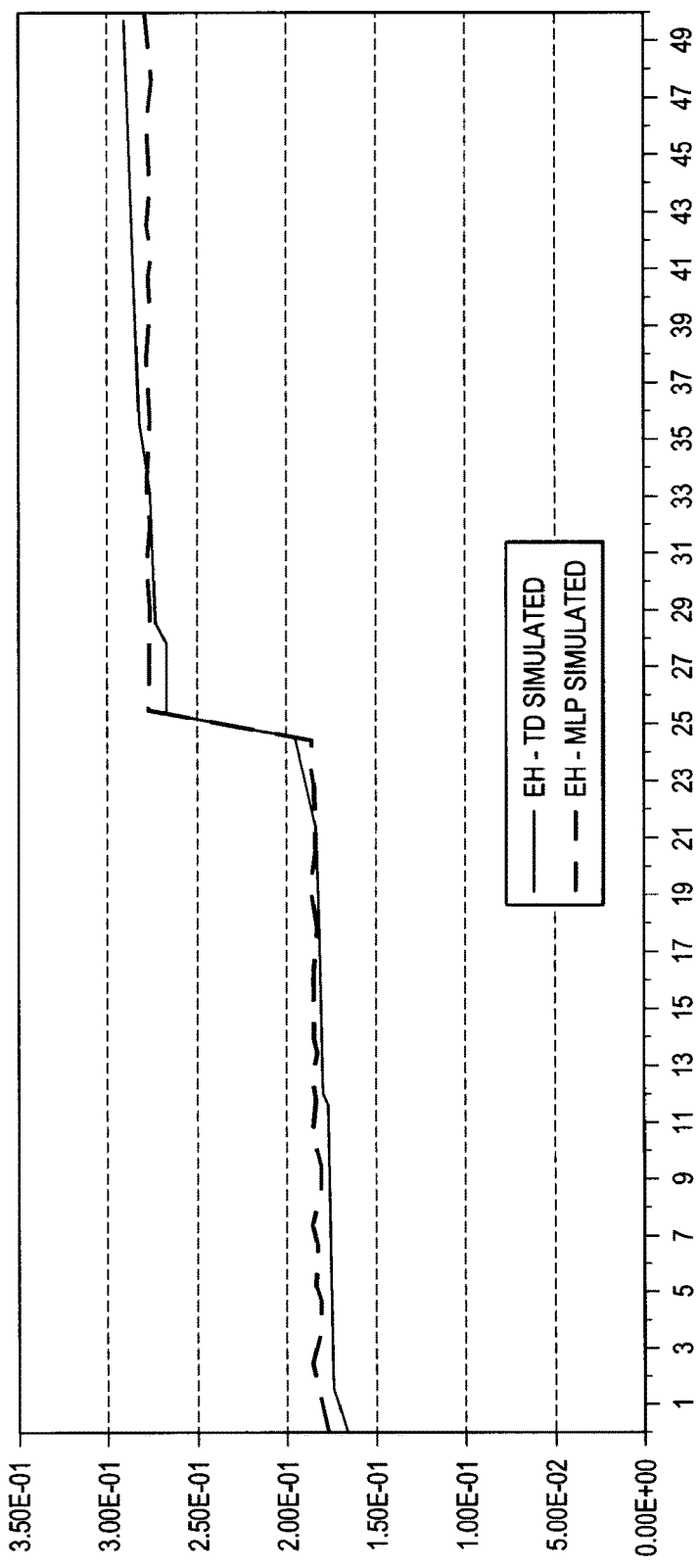
FIG. 9e is a graph illustrating an experimental embodiment of the comparison of a time domain simulation of eye height according to the present disclosure with a brute force simulation of eye width according to the prior art.
Figure 9F:
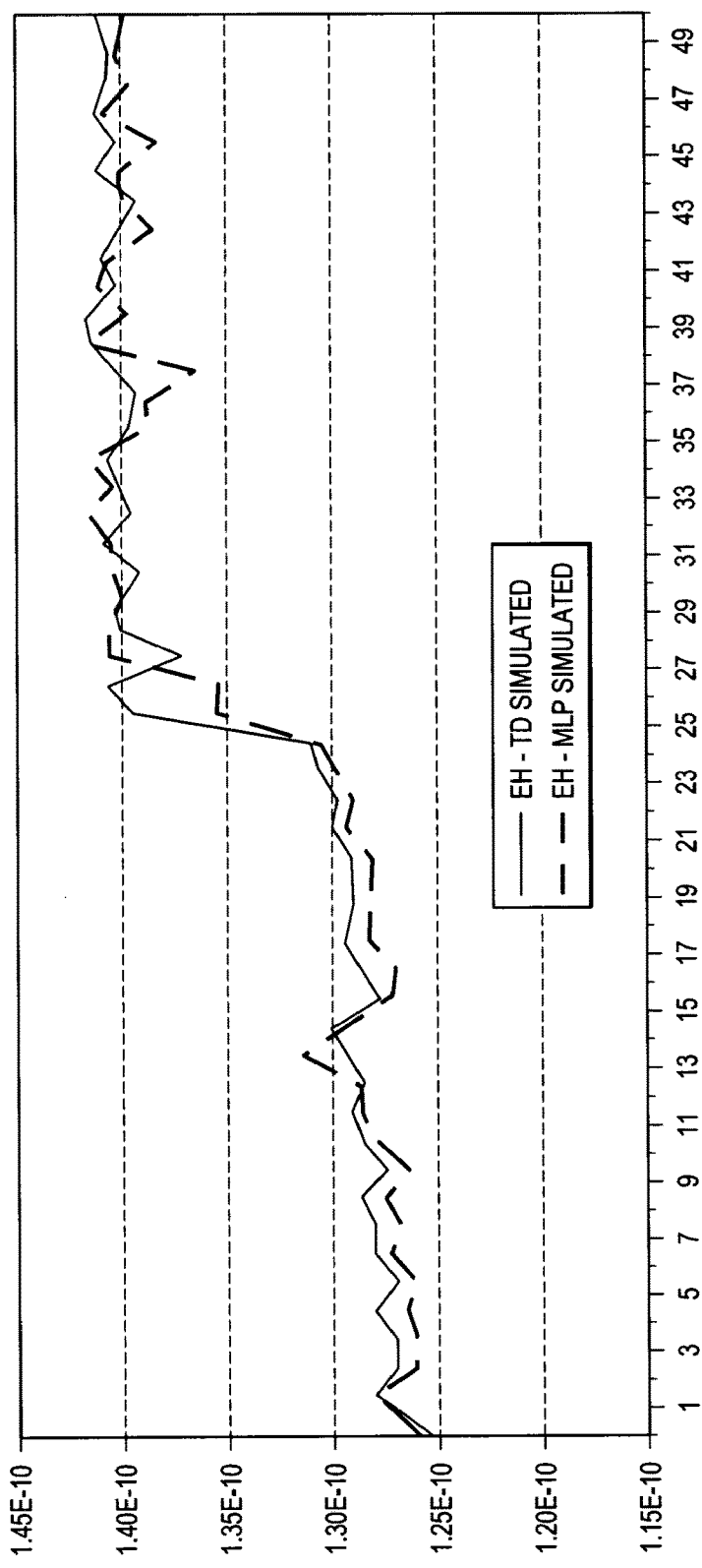
FIG. 9f is a graph illustrating an experimental embodiment of the comparison of a time domain simulation of eye width according to the present disclosure with a brute force simulation of eye width according to the prior art.

FIG. 9e illustrates time domain eye height responses for the simulated system 800 including 7 variables with an ANN training set size of 79 designs used with the systems and methods of the present disclosure, and a test set size of the 50 worst/best designs used with brute force calculation simulation methods. As can be seen, the time domain eye height responses using the systems and methods of the present disclosure match closely with the simulated time domain eye height responses using brute force calculation simulation methods. FIG. 9f illustrates time domain eye width responses for the simulated system 800 including 7 variables with an ANN training set size of 79 designs used with the systems and methods of the present disclosure, and a test set size of the 50 worst/best designs used with brute force calculation simulation methods. As can be seen, the time domain eye width responses using the systems and methods of the present disclosure match closely with the simulated time domain eye width responses using brute force calculation simulation methods.

Some results from the experimental embodiments are provided in the charts below. Chart B illustrates the eye height minimum and maximum error (in mV) along with the Norm by Norm error for time domain responses using the systems and methods of the present disclosure in 5 variable and 7 variables experimental embodiments, as compared to the brute force calculation simulation methods:

CHART B

| Test Case | Minimum Error (mv) | Maximum Error (mv) | Norm by Norm Error (%) |
|---|---|---|---|
| 5 Variables | 0.03 | 14.4 | 1.83 |
| 7 Variables | 0.04 | 10.7 | 2.11 |

Chart C illustrates the eye height minimum and maximum error (in ps) along with the Norm by Norm error for time domain responses using the systems and methods of the present disclosure in 5 variable and 7 variables experimental embodiments, as compared to the brute force calculation simulation methods:

CHART C

| Test Case | Minimum Error (ps) | Maximum Error (ps) | Norm by Norm Error (%) |
|---|---|---|---|
| 5 Variables | 0.01 | 7.38 | 1.39 |
| 7 Variables | 0.03 | 5.43 | 1.23 |

Chart D illustrates the time benefits in time domain responses using the systems and methods of the present disclosure compared to the brute force calculation simulation methods for the 5 variable and 7 variable experimental embodiments:

CHART D

| Test Case | N | 3N | TD: total time (min) | ANN: total time (min) | Speed Up |
|---|---|---|---|---|---|
| 5 Variables | 5 | 243 | 5472 | 118 | 46x |
| 7 Variables | 7 | 79 | 151374 | 622 | 243x |

Thus, systems and methods have been described that provide for accurately estimating time domain responses of a simulated system while substantially reducing the amount of time needed to determine those responses relative to conventional methods with similar accuracy. The systems and methods of the present disclosure provide for a full factorial analysis such that all electrical design spaces (both weakly and strongly non-linear) may be determined within hours, as opposed to months and years with conventional brute force calculation simulation methods. The systems and methods of the present disclosure provide response estimation times that are independent of the number of variables in the topology of a high speed link, with linear complexity in the modeling, as opposed to exponential in convention simulation systems. Finally, the systems and methods of the present disclosure are scalable with parasitics such as equalization and crosstalk in the channel.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A time domain response simulation system, comprising:
    a simulation variable subsystem that is configured to receive a plurality of variables for a simulated system that includes a serial link that couples together a plurality of hardware components;
    a frequency domain simulation engine that is configured to perform a frequency domain simulation over a plurality of different frequencies using each of the plurality of variables for the simulated system by providing signals through the serial link and the plurality of hardware components to provide a plurality of simulated frequency domain responses for the simulated system;
    a time domain simulation engine that is configured to perform a time domain simulation over the plurality of different frequencies using a subset of the plurality of simulated frequency domain responses for the simulated system by simulating signals through the serial link and the plurality of hardware components to produce a plurality of simulated time domain responses for the simulated system;
    a mapping engine that is configured to map the subset of the plurality of simulated frequency domain responses for the simulated system to the plurality of simulated time domain responses for the simulated system to produce a frequency-domain-to-time-domain mapping; and
    a prediction engine that is configured to determine a plurality of mapped time domain responses for the simulated system using the frequency-domain-to-time-domain mapping, wherein the plurality of simulated time domain responses and the plurality of mapped simulated time domain responses provide time domain responses for each of the plurality of variables for the simulated system, and wherein the time domain responses for each of the plurality of variables for the simulated system are used to generate a time domain eye height response graph for display on a video display.

2. The time domain response simulation system of claim 1, wherein the mapping engine and the prediction engine are provided by a neural network engine.

3. The time domain response simulation system of claim 1, wherein the subset of the plurality of simulated frequency domain responses for the simulated system includes a maximum simulated frequency domain response, a minimum simulated frequency domain response, and an average simulated frequency domain response.

4. The time domain response simulation system of claim 1, wherein frequency-domain-to-time-domain mapping is a non-linear mapping.

5. The time domain response simulation system of claim 1, wherein the time domain responses for each of the plurality of variables for the simulated system include an eye height.

6. The time domain response simulation system of claim 1, wherein the time domain responses for each of the plurality of variables for the simulated system include an eye width.

7. The time domain response simulation system of claim 1, wherein the time domain responses for each of the plurality of variables for the simulated system include a bit error rate.

8. An information handling system (IHS), comprising:
    a processing system;
    a memory system storing instructions that, when executed by the processing system, cause the processing system to:
        receive a plurality of variables for a simulated system that includes a serial link that couples together a plurality of hardware components;
        perform a frequency domain simulation over a plurality of different frequencies using each of the plurality of variables for the simulated system by simulating signals through the serial link and the plurality of hardware components to provide a plurality of simulated frequency domain responses for the simulated system;
        perform a time domain simulation over the plurality of different frequencies using a subset of the plurality of simulated frequency domain responses for the simulated system by providing signals through the serial link and the plurality of hardware components to produce a plurality of simulated time domain responses for the simulated system;

map the subset of the plurality of simulated frequency domain responses for the simulated system to the plurality of simulated time domain responses for the simulated system to produce a frequency-domain-to-time-domain mapping;

determine a plurality of mapped time domain responses for the simulated system using the frequency-domain-to-time-domain mapping, wherein the plurality of simulated time domain responses and the plurality of mapped time domain responses provide time domain responses for each of the plurality of variables for the simulated system; and generate, for display on a display device based on the time domain responses for each of the plurality of variables, a time domain eye width response graph for the simulated system.

9. The IHS of claim 8, wherein the subset of the plurality of simulated frequency domain responses for the simulated system includes a maximum simulated frequency domain response, a minimum simulated frequency domain response, and an average simulated frequency domain response.

10. The IHS of claim 8, wherein frequency-domain-to-time-domain mapping is a non-linear mapping.

11. The IHS of claim 8, wherein the time domain responses for each of the plurality of variables for the simulated system include an eye height.

12. The IHS of claim 8, wherein the time domain responses for each of the plurality of variables for the simulated system include an eye width.

13. The IHS of claim 8, wherein the time domain responses for each of the plurality of variables for the simulated system include a bit error rate.

14. A method for simulating time domain responses, comprising:

receiving, by a simulation system, a plurality of variables for a simulated system that includes a serial link and a plurality of hardware components;

performing, by the simulation system, a frequency domain simulation over a plurality of different frequencies using each of the plurality of variables for the simulated system by simulating signals through the serial link and the plurality of hardware components to provide a plurality of simulated frequency domain responses for the simulated system;

performing, by the simulation system, a time domain simulation over the plurality of different frequencies using a subset of the plurality of simulated frequency domain responses for the simulated system by providing signals through the serial link and the plurality of hardware components to produce a plurality of simulated time domain responses for the simulated system;

mapping, by the simulation system, the subset of the plurality of simulated frequency domain responses for the simulated system to the plurality of simulated time domain responses for the simulated system to produce a frequency-domain-to-time-domain mapping; and determining, by the simulation system, a plurality of mapped time domain responses for the simulated system using the frequency-domain-to-time-domain mapping, wherein the plurality of simulated time domain responses and the plurality of mapped time domain responses provide time domain responses for each of the plurality of variables for the simulated system generating, by the simulation system for display on a display device based on the time domain responses for each of the plurality of variables, a time domain bit error rate response graph for the simulated system.

15. The method of claim 14, wherein the producing the frequency-domain-to-time-domain mapping and the determining the plurality of mapped time domain responses for the simulated system using the frequency-domain-to-time-domain mapping is performed by a neural network in the simulation system.

16. The method of claim 14, wherein the subset of the plurality of simulated frequency domain responses for the simulated system includes a maximum simulated frequency domain response, a minimum simulated frequency domain response, and an average simulated frequency domain response.

17. The method of claim 14, wherein frequency-domain-to-time-domain mapping is a non-linear mapping.

18. The method of claim 14, wherein the time domain responses for each of the plurality of variables for the simulated system include an eye height.

19. The method of claim 14, wherein the time domain responses for each of the plurality of variables for the simulated system include an eye width.

20. The method of claim 14, wherein the time domain responses for each of the plurality of variables for the simulated system include a bit error rate.

* * * * *